United States Patent
Goo et al.

(10) Patent No.: US 12,430,542 B2
(45) Date of Patent: Sep. 30, 2025

(54) COMPILING ASYMMETRICALLY-QUANTIZED NEURAL NETWORK MODELS FOR DEEP LEARNING ACCELERATION

(71) Applicant: MediaTek Inc., Hsinchu (TW)

(72) Inventors: Chih-Wen Goo, Hsinchu (TW); Pei-Kuei Tsung, Hsinchu (TW); Chih-Wei Chen, Hsinchu (TW); Mingen Shih, Hsinchu (TW); Shu-Hsin Chang, Hsinchu (TW); Po-Hua Huang, Hsinchu (TW); Ping-Yuan Tsai, Hsinchu (TW); Shih-Wei Hsieh, Hsinchu (TW); You Yu Nian, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 781 days.

(21) Appl. No.: 17/838,240

(22) Filed: Jun. 12, 2022

(65) Prior Publication Data
US 2023/0401420 A1    Dec. 14, 2023

(51) Int. Cl.
*G06N 3/04*    (2023.01)
*G06F 8/41*    (2018.01)
*G06N 3/0495*    (2023.01)

(52) U.S. Cl.
CPC .......... *G06N 3/0495* (2023.01); *G06F 8/443* (2013.01); *G06N 3/04* (2013.01)

(58) Field of Classification Search
CPC ........ G06N 3/04; G06N 3/0495; G06F 8/443
See application file for complete search history.

(56) References Cited

U.S. PATENT DOCUMENTS

| | | | |
|---|---|---|---|
| 2022/0156567 A1 | 5/2022 | Lin et al. | |
| 2022/0261634 A1* | 8/2022 | Liu | G06N 3/08 |
| 2023/0004816 A1* | 1/2023 | Lee | G06N 3/044 |

FOREIGN PATENT DOCUMENTS

CN        114492778 A        5/2022

OTHER PUBLICATIONS

Jain, Animesh, et al. "Efficient execution of quantized deep learning models: A compiler approach." arXiv preprint arXiv:2006.10226 (2020). (Year: 2020).*

* cited by examiner

*Primary Examiner* — Benjamin P Geib
(74) *Attorney, Agent, or Firm* — Tong J. Lee

(57) ABSTRACT

A system receives a neural network model that includes asymmetric operations. Each asymmetric operation includes one or more fixed-point operands that are asymmetrically-quantized from corresponding floating-point operands. The system compiles a given asymmetric operation of the neural network model into a symmetric operation that includes a combined bias value. A compiler computes the combined bias value is a constant by merging at least zero points of input and output of the given asymmetric operation. The system then generates a symmetric neural network model including the symmetric operation for inference hardware to execute in fixed-point arithmetic.

20 Claims, 6 Drawing Sheets

Asymmetric Convolution: $\text{Mult} \times ((X - Z_x) \times W + \text{bias}) + Z_o$

⇓

Symmetric Convolution: $\text{Mult} \times (X \times W + \text{Bias})$

FIG. 5A

Asymmetric PReLU:
if $X > Z_x$, $O = \text{Mult}_A \times (X - Z_x) + Z_o$;
else, $O = \text{Mult}_B \times ((X - Z_x) \times \text{alpha}) + Z_o$.

⇓

Symmetric PReLU:
if $X > Z_x$, $O = \text{Mult}_A \times (X - (\text{BiasA}))$;
else, $O = \text{Mult}_B \times ((X \times \text{alpha}) - (\text{BiasB}))$.

FIG. 5B

Asymmetric Add: $O = \text{Mult}_O \times (\text{Mult}_{X1} \times (X1 - Z_{x1}) + \text{Mult}_{X2} \times (X2 - Z_{x2})) - Z_o$

⇓

Symmetric Add: $O = \text{Mult}_O \times ((\text{Mult}_{X1} \times X1 + \text{Mult}_{X2} \times X2) - (\text{BiasC}))$

FIG. 5C

COMPILING ASYMMETRICALLY-QUANTIZED NEURAL NETWORK MODELS FOR DEEP LEARNING ACCELERATION

TECHNICAL FIELD

Embodiments of the invention relate to neural network processing, and more specifically, to the symmetrization of neural network models that are asymmetrically-quantized.

BACKGROUND

A deep neural network is a neural network with an input layer, an output layer, and one or more hidden layers between the input layer and the output layer. Each layer performs operations on one or more tensors, which can be zero-dimensional (a.k.a. a scaler), one-dimensional (a.k.a. a vector), two-dimensional (a.k.a. a matrix), or multi-dimensional. Neural network computing is computation-intensive and bandwidth-demanding.

Floating-point numbers with a large bit width (e.g., 16 or 32 bits) can be used in numerical computations for high accuracy. However, the high accuracy is achieved at the cost of high power consumption and high hardware cost. Therefore, most systems run neural network inferences in fixed-point (e.g., 8-bit integer) by quantizing a neural network model that is trained in floating-point.

The quantization of a floating-point neural network for fixed-point inferences can be symmetric or asymmetric. FIG. 1A illustrates an example of symmetric quantization. With symmetric quantization, both the floating-point range (e.g., [−Mfp, Mfp]) and the quantized fixed-point range (e.g., [−128, 127]) are centered at zero. Moreover, the floating-point zero is quantized to the fixed-point zero. However, if the utilization of the floating-point range is biased towards one side (e.g., the positive side), the quantized fixed-point range at the other side (e.g., the negative side) would be poorly utilized.

FIG. 1B illustrates an example of asymmetric quantization. With asymmetric quantization, the minimum and maximum of the float-point range are mapped to the minimum and maximum of the fixed-point range, respectively. That is, only the utilized floating-point range is mapped to the quantized fixed-point range. Thus, the quantized fixed-point range can be fully utilized. A fully-utilized quantized range means less quantization error and improved accuracy.

Although asymmetric quantization enables better utilization of quantized bits, operations that are based on symmetric quantization is much simpler to implement. In asymmetric quantization, the zero points require additional hardware logic. The additional hardware causes an increase in circuit critical path, which limits the maximum frequency and increases latency. The additional hardware also increases power consumption, circuit area, and hardware cost.

Therefore, it is a challenge to balance the need for better computational accuracy and hardware design concerns.

SUMMARY

In one embodiment, a method is provided for neural network computing. The method comprises the step of receiving a neural network model that includes asymmetric operations. Each asymmetric operation includes one or more fixed-point operands that are asymmetrically-quantized from corresponding floating-point operands. The method further comprises the step of compiling, by a compiler, a given asymmetric operation of the neural network model into a symmetric operation that includes a combined bias value. The combined bias value is a constant computed by the compiler by merging at least zero points of input and output of the given asymmetric operation. The method further comprises the step of generating a symmetric neural network model including the symmetric operation for inference hardware to execute in fixed-point arithmetic.

In another embodiment, a system is provided for neural network computing. The system comprises a memory to store a compiler and one or more neural network models, and processing hardware coupled to the memory. The processing hardware is operative to receive a neural network model that includes asymmetric operations. Each asymmetric operation includes one or more fixed-point operands that are asymmetrically-quantized from corresponding floating-point operands. The processing hardware is further operative to compile, by the compiler, a given asymmetric operation of the neural network model into a symmetric operation that includes a combined bias value. The combined bias value is a constant computed by the compiler by merging at least zero points of input and output of the given asymmetric operation. The processing hardware is further operative to generate a symmetric neural network model including the symmetric operation for an accelerator circuit to execute in fixed-point arithmetic Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 5A, 5B, and 5C illustrate examples of conversions from asymmetric operations to symmetric operations according to some embodiments.

DETAILED DESCRIPTION

Figure 1A:
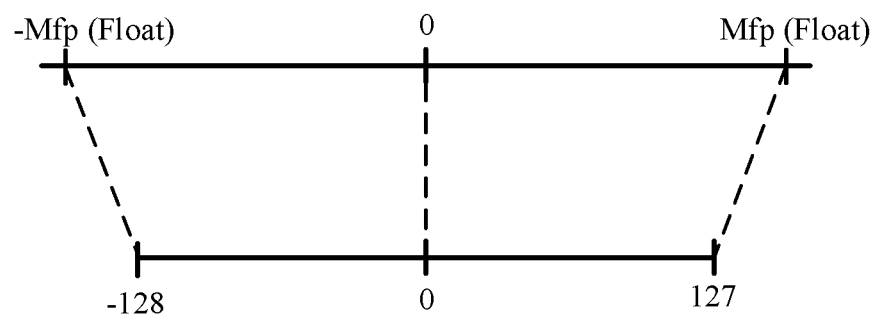
FIG. 1A illustrates an example of symmetric quantization.
Figure 1B:
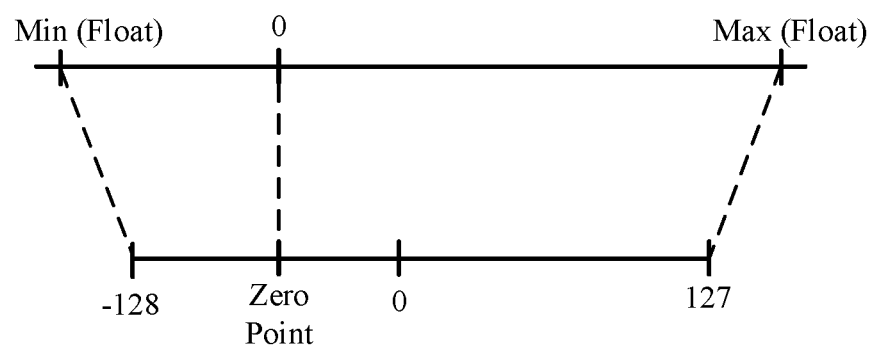
FIG. 1B illustrates an example of asymmetric quantization.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a symmetrization mechanism for a deep learning accelerator to operate in fixed-point according to a symmetric neural network model. A compiler receives an asymmetric neural network model that includes multiple layers of asymmetric operations. Each asymmetric operation includes one or more fixed-point operands that are asymmetrically-quantized from corresponding floating-point operands. A compiler may compile an asymmetric operation into a symmetric operation to reduce the required operators and the bit width of the inference hardware. The reduction comes from, at least in part, the use of a combined bias value in the symmetric operation. The compiler computes the combined bias value based on the zero points of an input and an output of the asymmetric operation. The compiler may further combine a number of scaling factors into a combined scaling factor. The computations performed at compile-time reduce the computations at inference. The reduction in inference computations can prevent an increase in hardware area and lower hardware costs.

An "asymmetric operation" can be described by a mathematical expression in which the fixed-point input and the fixed-point output are expressed as $Sx \times (X-Zx)$ and $So \times (O-Zo)$, respectively, where $Zx$ and $Zo$ are the input's and the output's zero points (which are non-zero), respectively, and $Sx$ and $So$ are the input's and the output's scaling factors, respectively. The values of $Zx$ and $Sx$ are determined by the asymmetric quantization of the input to a fixed-point range with a predetermined bit width (e.g., 8-bit integer). Similarly, the values of $Zo$ and $So$ are determined by the asymmetric quantization of the output to a fixed-point range with a predetermined bit width (e.g., 8-bit integer).

A "symmetric operation" can be described by a mathematical expression in which the fixed-point input and the fixed-point output are expressed as $Sx \times (X)$ and $So \times (O)$, respectively. That is, $Zx$ and $Zo$ are mapped to the floating-point zero value. The scaling factors $Sx$ and $So$ are applied to X and O, respectively, without the presence of the zero points.

The compiler can symmetrize an asymmetric operation into a symmetric operation for execution by the accelerator that operates in fixed-point arithmetic. The symmetric operation executed by the accelerator does not include zero points; this is because the compiler has already replaced the zero points with a compiler-computed value, or merged the zero points into a compiler-computed value. Thus, the accelerator at inference can execute the symmetric operation without needing to know the zero point of each operand.

For example, in symmetric convolution, filter weights are convolved with input activation X, while in asymmetric convolution, filter weights are convolved with offset input activation (X−Zx). The compiler may symmetrize the asymmetric convolution such that the zero points of input and output are merged into a bias value, which is evaluated at compile time. Thus, the symmetrization reduces inference-time computations and inference hardware costs. The compiler may also symmetrize other neural network operations, such as PReLU, Add, etc. Thus, the accelerator can efficiently perform neural network inference in fixed-point by executing symmetric operations.

Figure 2:
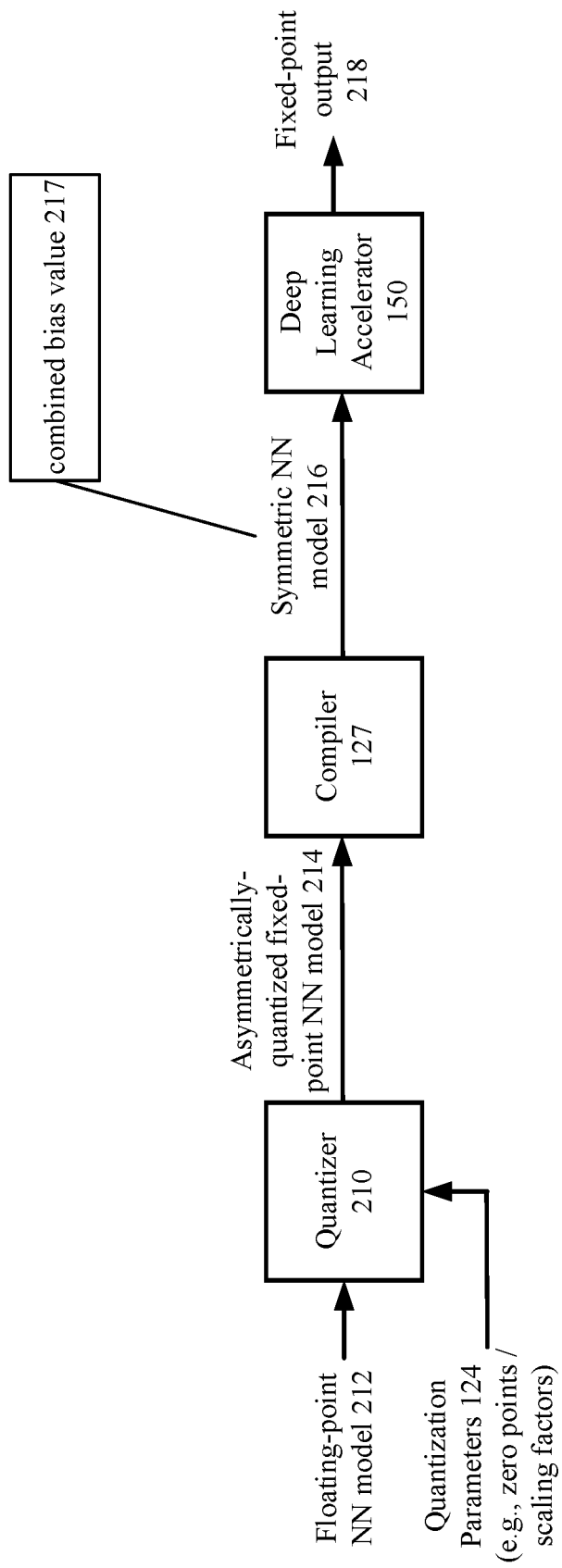
FIG. 2 illustrates an asymmetrically-quantized neural model compiled into a symmetric model according to one embodiment.

FIG. 2 illustrates an asymmetrically-quantized neural model compiled into a symmetric model according to one embodiment. A quantizer 210 receives a floating-point neural network (NN) model 212, which defines neural network operations for floating-point operands. The quantizer 210 performs asymmetric quantization on the floating-point neural network model 212 to produce an asymmetrically-quantized fixed-point neural network model 214 for fixed-point execution. The quantizer 210 uses quantization parameters 124 such as zero points and scaling factors of the operands when performing the asymmetric quantization. The asymmetrically-quantized fixed-point neural network model 214 includes fixed-point operands that are offset by corresponding zero points and scaled by corresponding scaling factors. The asymmetrically-quantized fixed-point neural network model 214 is processed by a compiler 127 to produce a symmetric neural network model 216 for fixed-point execution. The symmetric neural network model 216 includes operations that use compiler-generated combined bias values 217 to reduce the amount of computation at inference time. The compiler-generated values may also include combined scaling factors. A deep learning accelerator 150 (also referred to as the "accelerator 150") performs neural network operations on the symmetric neural network model 216 using fixed-point arithmetic and produces fixed-point output 218.

Figure 3:
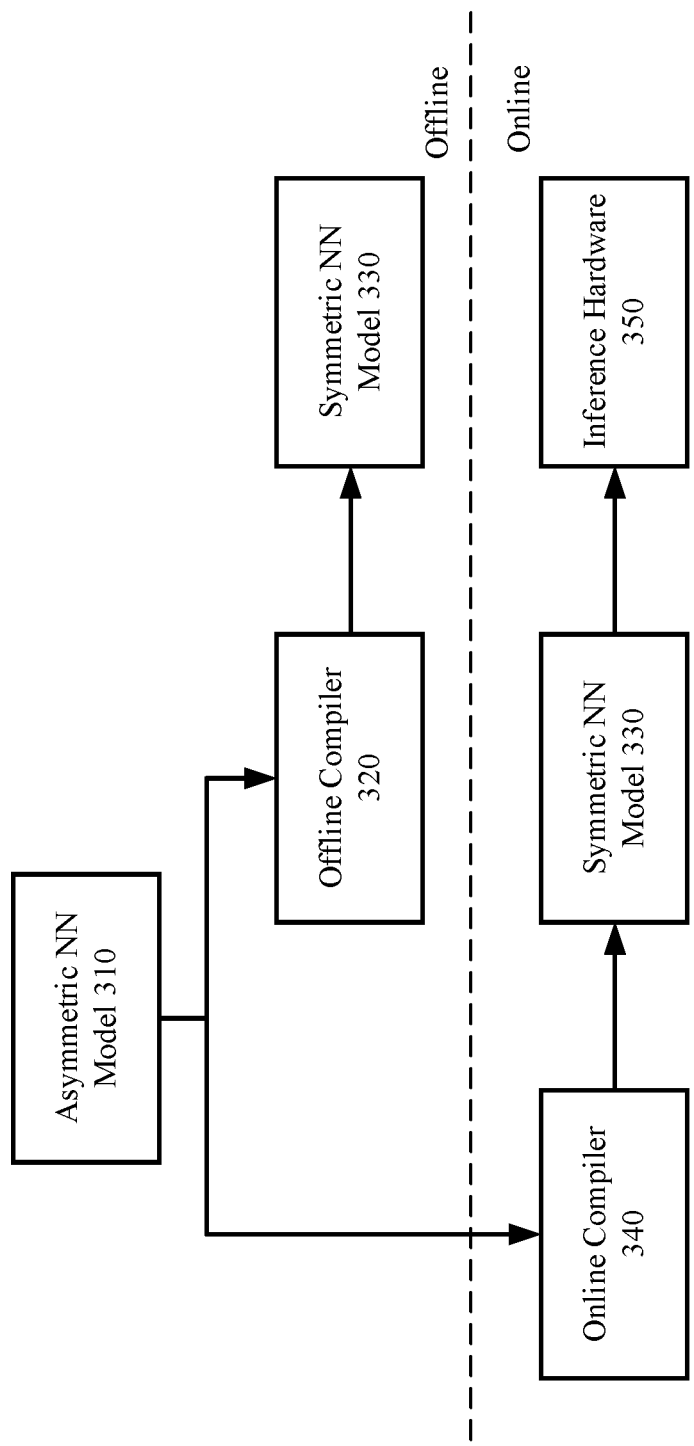
FIG. 3 illustrates examples of a compiler according to some embodiments.

FIG. 3 illustrates examples of a compiler according to some embodiments. In one embodiment, the compiler may be an offline compiler 320, which compiles an asymmetric neural network model 310 into a symmetric neural network model 330. The offline compiler 320 is an example of the compiler 127 in FIG. 2. The asymmetric neural network model 310 may be part of a computer program to be executed by inference hardware 350 (e.g., the deep learning accelerator 150 in FIG. 2). The offline compiling is also referred to as ahead-of-time compiling, which is performed when the inference hardware 350 has not started executing the computer program. In an alternative embodiment, the compiler may be an online compiler 340, which compiles the asymmetric neural network model 310 into the symmetric neural network model 330 when the inference hardware 350 has started executing the computer program and is just-in-time for the execution of the symmetric neural network model 330. The online compiler 340 is another example of the compiler 127 in FIG. 2.

Figure 4A:
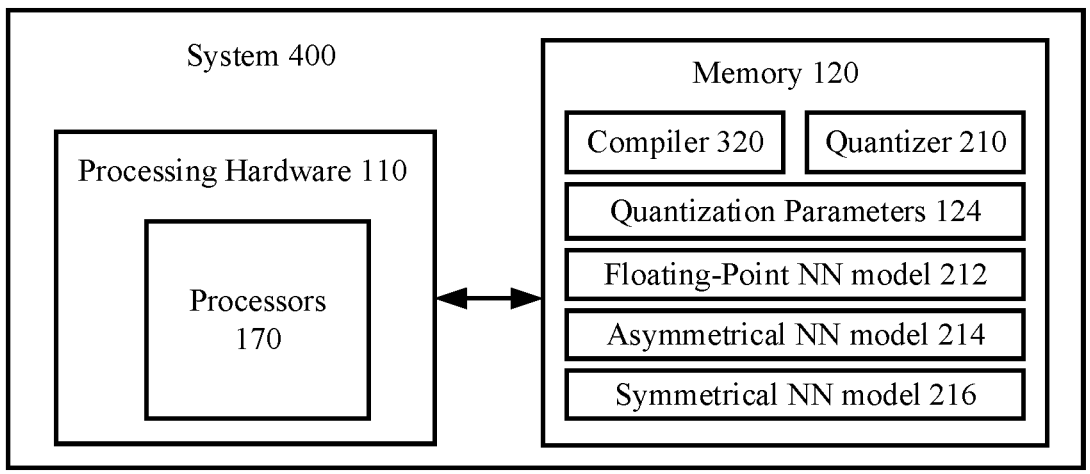
FIGS. 4A, 4B, and 4C are block diagrams illustrating systems operative to symmetrize the operations of a neural network according to some embodiments.

FIG. 4A is a block diagram illustrating a system 400 operative to perform offline symmetrization of neural network operations according to one embodiment. The system 400 includes processing hardware 110 that further comprises one or more processors 170 such as a central processing unit (CPU), a graphics processing unit (GPU), a digital processing unit (DSP), a field-programmable gate array (FPGA), and other general-purpose processors and/or special-purpose processors. In one embodiment, the processing hardware 110 may be part of a system-on-a-chip (SOC).

The processing hardware 110 is coupled to a memory 120, which may include on-chip memory and off-chip memory devices such as dynamic random access memory (DRAM), static random access memory (SRAM), flash memory, and other non-transitory machine-readable storage media; e.g., volatile or non-volatile memory devices. The term "on-chip" is used herein to mean on the SOC where the processing hardware 110 is located, and the term "off-chip" is used herein to mean off the SOC. To simplify the illustration, the memory 120 is represented as one block; however, it is understood that the memory 120 may represent a hierarchy of memory components such as cache memory, local memory to the accelerator 150, system memory, solid-state or magnetic storage devices, etc. The processing hardware 110 executes instructions stored in the memory 120 to perform operating system functionalities and run user applications. The memory 120 may store a number of DNN models, each of which can be represented by a computational graph that includes multiple operation layers, including an input layer, an output layer, and one or more hidden layers in between. Each DNN model may include one or more convolution layers, and may have been trained to have the weights associated with the convolution layers stored in the memory 120.

In one embodiment, the system 400 includes the quantizer 210 to perform floating-point to fixed-point quantization. FIG. 4A shows the quantizer 210 as a software module stored in the memory 120 and executed by the processing hardware 110. In an alternative embodiment, the quantizer 210 may be a hardware circuit or a combination of both hardware and software. The quantizer 210 is operative to perform asymmetric quantization on the operands of the floating-point neural network model 212 according to the quantization parameters 124 stored in the memory 120. The quantization parameters 124 includes a scaling factor and a zero point of each operand of one or more layers of the floating-point neural network model 212. The quantization parameters 124 may be generated from training or calibration of the floating-point neural network model 212.

In one embodiment, the system 400 further includes the offline compiler 320 stored in the memory 120. The offline compiler 320 is operative to compile the asymmetrically-quantized fixed-point neural model 214 (also referred to as "the a asymmetric neural network 214") into the symmetric neural network model 216. The symmetric neural network model 216 may be sent to another system that includes a deep learning accelerator (e.g., the accelerator 150) to perform neural network operations using fixed-point arithmetic and to produce a fixed-point output.

Figure 4B:
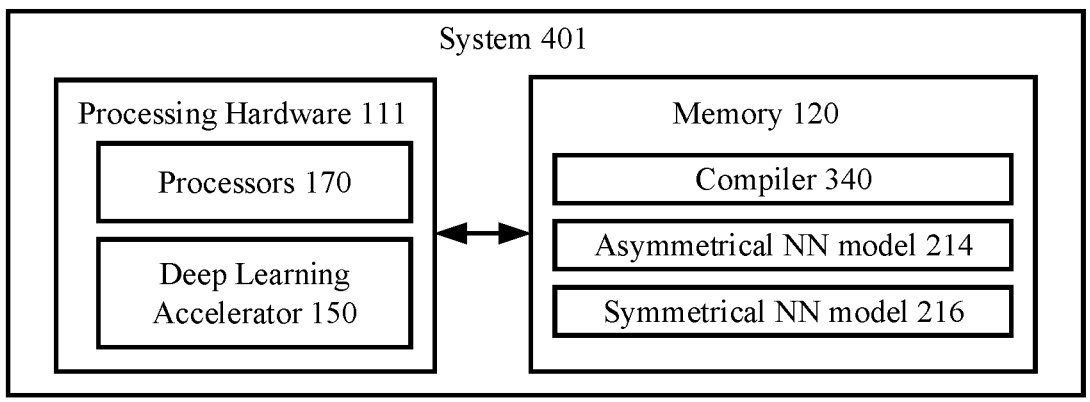

FIG. 4B is a block diagram illustrating a system 401 operative to perform online symmetrization of neural network operations according to one embodiment. The system 401 includes processing hardware 111, which further includes the accelerator 150 in addition to the processors 170. The accelerator 150 performs neural network operations according to the symmetric neural network model 216. Examples of the neural network operations performed by the accelerator 150 include, but are not limited to: convolution, deconvolution, fully-connected operations, normalization, activation, pooling, resizing, element-wise arithmetic, concatenation, etc. In one embodiment, the accelerator 150 may include specialized hardware for performing neural network inferences in fixed-point. For example, the accelerator 150 may include adders, subtractors, multipliers, etc., with a pre-determined bit width for operating on fixed-point operands such as 8-bit or 16-bit integers. In one embodiment, the memory 120 may store instructions which, when executed by the accelerator 150, cause the accelerator 150 to perform neural network computing according to the symmetric neural network model 216. In this embodiment, the system 401 receives (e.g., by downloading or by another data transfer method) the asymmetric neural network model 214 from another system that includes the quantizer 210 to quantize the floating-point neural network model 212 and output the asymmetric neural network model 214. The online compiler 340 in the system 401 compiles the asymmetric neural network model 214 into the symmetric neural network model 216 for the accelerator 150 to execute.

Figure 4C:
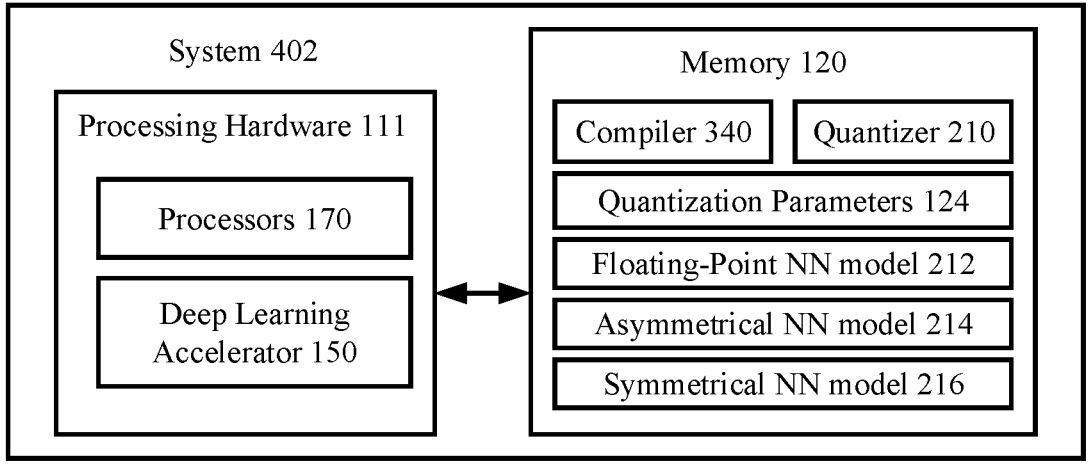

FIG. 4C is a block diagram illustrating a system 402 operative to perform online symmetrization of neural network operations according to another embodiment. Referring also to FIG. 2, the system 402 performs all of the operations shown in FIG. 2, including the operations of the quantizer 210, the compiler 127 (more specifically, the online compiler 340 in this embodiment), and the accelerator 150. These operations have been described above and are not repeated here.

FIGS. 5A, 5B, and 5C illustrate examples of conversions from asymmetric operations to symmetric operations according to some embodiments. The asymmetric operations may be operations in the asymmetrically-quantized fixed-point neural network model 214 (FIG. 2), and the symmetric operations may be operations in the symmetric neural network model 216 (FIG. 3). The conversions may be performed by a compiler, such as the compiler 127 in FIG. 2.

FIG. 5A shows that asymmetric convolution can be expressed as:

$$\text{Mult} \times ((X - Z_x) \times W + \text{bias}) + Z_o,$$

wherein W is weight, Zx is the zero point of input X, Zo is the zero point of output O, bias is the convolution bias, and Mult is the shift to target bit number. Mult can be computed from a combined scaling factor Sx×Sw/So, where Sx, Sw, and So are the scaling factors of X, W, and O, respectively. The zero point of the weights is equal to zero. That is, the weights are symmetrically mapped from floating-point to fixed-point.

The compiler converts the asymmetric convolution into a symmetric convolution expressed as:

$$\text{Mult} \times (X \times W + \text{Bias}),$$

where Bias=(bias−Zx×W+Zo/Mult). The compiler computes the constant Bias, which is a combined bias value, and Mult, which is a combined scaling factor. The combined bias value merges the zero points of the input X and the output O into one constant term. Thus, the accelerator can multiply X with multipliers such as Mult and W without involving Zx in the multiplication. That is, the accelerator that is designed to handle symmetric operations can now support asymmetric operations such as convolution. Zero padding in the symmetric convolution becomes Zx padding.

Compared with symmetric convolution, asymmetric convolution requires more operators and a larger bit width for the multiply operator. For 8-bit quantization, the increase in hardware area is estimated to be: $9^2/8^2 = 126.5\% + 2$ sub/add operators. The symmetrization of convolution saves this bit increase as well as the extra two sub/add operators.

FIG. 5B shows that an asymmetric PReLU operation can be expressed as:

$$\text{if } X > Z_x, O = \text{Mult}_A \times (X - Z_x) + Z_o;$$

$$\text{else}, O = \text{Mult}_B \times ((X - Z_x) \times \text{alpha}) + Z_o.$$

The compiler converts the asymmetric PReLU into symmetric PReLU expressed as:

$$\text{if } X > Z_x, O = \text{Mult}_A \times (X - (Z_x - Z_o/\text{Mult}_A)) = \text{Mult}_A \times (X - (\text{BiasA}));$$

$$\text{else}, O = \text{Mult}_B \times ((X \times \text{alpha}) - (Z_x \times \text{alpha} - Z_o/\text{Mult}_B)) = \text{Mult}_B \times ((X \times \text{alpha}) - (\text{BiasB})).$$

The compiler computes the constants BiasA and BiasB, each of which is a combined bias value, and $\text{Mult}_A$ and Mult$_B$, each of which is a combined scaling factor. The combined bias value merges the zero points of the input X and the output O into one constant term. Thus, the accelerator can multiply X with multipliers such as Mult$_A$, Mult$_B$, or alpha without involving Zx in the multiplication. The symmetrization of PReLU saves bit increase and one add operator.

FIG. 5C shows that an asymmetric add operation can be expressed as:

$$O=\text{Mult}_O \times (\text{Mult}_{X1} \times (X1-Z_{x1}) + \text{Mult}_{X2} \times (X2-Z_{x2})) - Z_o.$$

The compiler converts the asymmetric add into symmetric add expressed as:

$$O=\text{Mult}_O \times ((\text{Mult}_{X1} \times X1 + \text{Mult}_{X2} \times X2) - (\text{Mult}_{X1} \times Z_{x1} + \text{Mult}_{X2} \times Z_{x2} + \text{Mult}_O \times Z_o)) = \text{Mult}_O \times ((\text{Mult}_{X1} \times X1 + \text{Mult}_{X2} \times X2) - (\text{BiasC})).$$

The compiler computes the constant BiasC, which is a combined bias value. The combined bias value merges the zero points of inputs X1, X2, and the output O into one constant term. Thus, the accelerator can scale X1 and X2 (using respective scaling factors Mult$_{X1}$ and Mult$_{X2}$) without involving any zero points in the multiplications. The symmetrization of add saves bit increase and two subtract operators.

Figure 6:
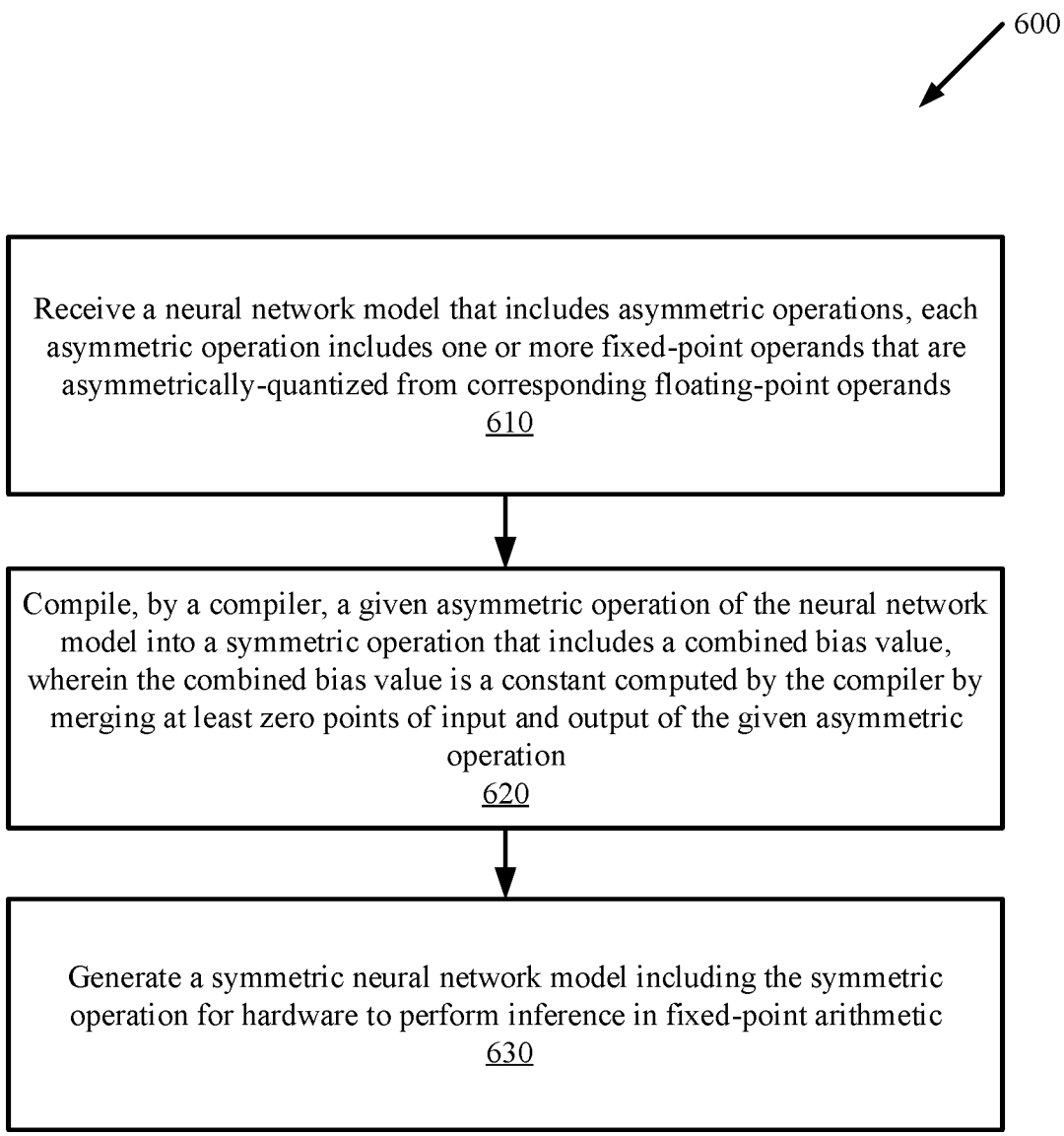
FIG. 6 is a flow diagram illustrating a method for neural network computing according to one embodiment.

FIG. 6 is a flow diagram illustrating a method 600 for neural network computing according to one embodiment. The method 600 may be performed by a system such as any of the systems in FIGS. 4A, 4B, and/or 4C to symmetrize an asymmetric neural network model. More specifically, the method 600 may be performed by any of the compilers in the systems in FIGS. 4A, 4B, and/or 4C.

The method 600 begins at step 610 when a compiler receives a neural network model that includes asymmetric operations. Each asymmetric operation includes one or more fixed-point operands that are asymmetrically-quantized from corresponding floating-point operands. At step 620, the compiler compiles a given asymmetric operation of the neural network model into a symmetric operation that includes a combined bias value. The combined bias value is a constant computed by the compiler by merging at least zero points of input and output of the given asymmetric operation. At step 630, the compiler generates a symmetric neural network model including the symmetric operation for hardware to perform inference in fixed-point arithmetic.

The operations of the flow diagram of FIG. 6 have been described with reference to the exemplary embodiments of FIGS. 4A, 4B, and 4C. However, it should be understood that the operations of the flow diagram of FIG. 6 can be performed by embodiments of the invention other than the embodiments of FIGS. 4A, 4B, and 4C, and the embodiments of FIGS. 4A, 4B, and 4C can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components, blocks, or units have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for neural network computing, comprising:
   receiving a neural network model that includes asymmetric operations, each asymmetric operation including one or more fixed-point operands that are asymmetrically-quantized from corresponding floating-point operands;
   compiling, by a compiler, a given asymmetric operation of the neural network model into a symmetric operation that includes a combined bias value, wherein the combined bias value is a constant computed by the compiler by merging at least zero points of input and output of the given asymmetric operation; and
   generating a symmetric neural network model including the symmetric operation for inference hardware to execute in fixed-point arithmetic.

2. The method of claim 1, wherein the asymmetric operations include one or more of: convolution, parametric ReLU (PReLU), and add.

3. The method of claim 1, wherein zero-padding in a convolution layer is converted to zero point padding.

4. The method of claim 1, wherein weights in a convolution layer of the neural network model are symmetrically mapped from floating-point to fixed-point.

5. The method of claim 1, wherein for a convolution operation in the neural network model, the compiling further comprises:
   merging scaling factors of the input, the output, and weights of an asymmetric convolution into a multiplicative factor of a symmetric convolution.

6. The method of claim 1, wherein for a convolution operation in the neural network model, the combined bias value Bias=(bias−Zx×W+Zo/Mult), where bias is a convolutional bias, W is convolutional weights, Zx and Zo are the zero points of the input and the output, respectively, and Mult is a multiplicative factor.

7. The method of claim 1, wherein for a PReLU operation in the neural network model, the compiler computes a first combined bias value BiasA=(Z$_x$−Z$_o$/Mult$_A$) and a second combined bias value BiasB=(Z$_x$×alpha−Z$_o$/Mult$_B$), where Zx and Zo are the zero points of the input and the output, respectively, and Mult$_A$ and Mult$_B$ are multiplicative factors.

8. The method of claim 1, wherein for an add operation in the neural network model, the combine bias value BiasC= (Mult$_{X1}$×Z$_{x1}$+Mult$_{X2}$×Z$_{x2}$+Mult$_O$×Z$_o$), where Z$_{x1}$, Z$_{x2}$, and Z$_o$ are the zero points of a first input, a second input, and the output, respectively, and Mult$_{X1}$, Mult$_{X2}$, and Mult$_O$ are multiplicative factors.

9. The method of claim 1, wherein the neural network model is part of a computer program and the compiler is an offline compiler that compiles the neural network model before execution of the computer program starts.

10. The method of claim 1, wherein the neural network model is part of a computer program and the compiler is an online compiler that compiles the neural network model after execution of the computer program has started.

11. A system for neural network computing, comprising:
   a memory to store a compiler and one or more neural network models; and processing hardware coupled to the memory, the processing hardware operative to:

receive a neural network model that includes asymmetric operations, each asymmetric operation including one or more fixed-point operands that are asymmetrically-quantized from corresponding floating-point operands;

compile, by the compiler, a given asymmetric operation of the neural network model into a symmetric operation that includes a combined bias value, wherein the combined bias value is a constant computed by the compiler by merging at least zero points of input and output of the given asymmetric operation; and generate a symmetric neural network model including the symmetric operation for an accelerator circuit to execute in fixed-point arithmetic.

12. The system of claim 11, wherein the asymmetric operations include one or more of: convolution, parametric ReLU (PReLU), and add.

13. The system of claim 11, wherein zero-padding in a convolution layer is converted to zero point padding.

14. The system of claim 11, wherein weights in a convolution layer of the neural network model are symmetrically mapped from floating-point to fixed-point.

15. The system of claim 11, wherein for a convolution operation in the neural network model, the processing hardware is further operative to:

merge scaling factors of the input, the output, and weights of an asymmetric convolution into a multiplicative factor of a symmetric convolution.

16. The system of claim 11, wherein for a convolution operation in the neural network model, the combined bias value Bias=(bias−Zx×W+Zo/Mult), where bias is a convolutional bias, W is convolutional weights, Zx and Zo are the zero points of the input and the output, respectively, and Mult is a multiplicative factor.

17. The system of claim 11, wherein for a PReLU operation in the neural network model, the compiler computes a first combined bias value BiasA=$(Z_x-Z_o/\text{Mult}_A)$ and a second combined bias value BiasB=$(Z_x \times \text{alpha} - Z_o/\text{Mult}_B)$, where Zx and Zo are the zero points of the input and the output, respectively, and $\text{Mult}_A$ and $\text{Mult}_B$ are multiplicative factors.

18. The system of claim 11, wherein for an add operation in the neural network model, the combine bias value BiasC=$(\text{Mult}_{X1} \times Z_{x1} + \text{Mult}_{X2} \times Z_{x2} + \text{Mult}_O \times Z_o)$, where $Z_{x1}$, $Z_{x2}$, and $Z_o$ are the zero points of a first input, a second input, and the output, respectively, and $\text{Mult}_{X1}$, $\text{Mult}_{X2}$, and $\text{Mult}_O$ are multiplicative factors.

19. The system of claim 11, wherein the neural network model is part of a computer program and the compiler is an offline compiler that compiles the neural network model before execution of the computer program starts.

20. The system of claim 11, wherein the neural network model is part of a computer program and the compiler is an online compiler that compiles the neural network model after execution of the computer program has started.

* * * * *